United States Patent
Soon (10) Patent No.: US 6,406,327 B1
(45) Date of Patent: Jun. 18, 2002

(54) ORGANIZER FOR CABLES AND ACCESSORIES IN A COMPUTER OR AUDIO-VIDEO SYSTEM

(76) Inventor: Goh Kok Soon, Suites 802 & 803, 8th Floor, MWE Plaza, No. 8, Lebuh Farquhar, 10200 Penang (MY)

( * ) Notice: Subject to any disclaimer, the term of this patent is extended or adjusted under 35 U.S.C. 154(b) by 0 days.

(21) Appl. No.: 09/762,429

(22) PCT Filed: Aug. 3, 1999

(86) PCT No.: PCT/AU99/00625
§ 371 (c)(1),
(2), (4) Date: Feb. 6, 2001

(87) PCT Pub. No.: WO00/11539
PCT Pub. Date: Mar. 2, 2000

(30) Foreign Application Priority Data

Aug. 19, 1998 (MY) .......................... PI9803779

(51) Int. Cl.[7] .............................. H01R 13/72
(52) U.S. Cl. ................. 439/501; 439/638; 361/686; 361/725
(58) Field of Search .................. 439/501, 638–640, 439/449; 361/683, 686, 725, 803, 685

(56) References Cited

U.S. PATENT DOCUMENTS

| | | | |
|---|---|---|---|
| 4,993,961 A | * | 2/1991 | Hisatomi et al. ........... 439/501 |
| 5,006,960 A | * | 4/1991 | Kallin et al. ................ 439/449 |
| 5,045,977 A | | 9/1991 | Cesar .......................... 361/424 |
| 5,050,041 A | | 9/1991 | Shafi ........................... 361/391 |
| 5,349,483 A | | 9/1994 | Tsai ......................... 360/97.01 |
| 5,637,015 A | | 6/1997 | Tan et al. ................... 439/607 |
| 5,761,029 A | * | 6/1998 | Jay ............................. 361/725 |
| 5,761,033 A | | 6/1998 | Willhelm .................... 361/686 |
| 5,774,331 A | * | 6/1998 | Sach ........................... 361/686 |
| 5,807,139 A | * | 9/1998 | Volansky et al. ........... 439/638 |
| 5,815,109 A | | 9/1998 | Tan ............................. 341/177 |
| 5,924,892 A | * | 7/1999 | Ferracina .................... 439/501 |

FOREIGN PATENT DOCUMENTS

DE 29607853 U1 7/1996

OTHER PUBLICATIONS

Derwent Abstract Accession No: 96–244230/25, Class V04, JP 08096882 A (KEL KK)—Abstract.

* cited by examiner

Primary Examiner—Gary Paumen
Assistant Examiner—Felix D. Figueroa
(74) Attorney, Agent, or Firm—Wells St. John P.S.

(57) ABSTRACT

There is disclosed an organizing apparatus, to flexibly relocate the computer port or socket to the front, such that connection of computer peripheral becomes simpler. There are also disclosed apparatus accessories to flexibly relocate the computer port or socket to the front. The apparatus and the accessories can also be used to flexibly hold and secure electrical device and electrical components at the front of the computer system. The organizing apparatus can be incorporated into a computer or computer casing. The organizing apparatus may also be provided with cable organizing means, wherein access cables of the computer system can be organized and stored within its housing.

19 Claims, 11 Drawing Sheets

ORGANIZER FOR CABLES AND ACCESSORIES IN A COMPUTER OR AUDIO-VIDEO SYSTEM

CROSS REFERENCE TO RELATED APPLICATION

This application claims priority from PCT international Application Number PCT/AU99/00625, which was filed Aug. 3, 1999, and was published in English.

1. TECHNICAL FIELD OF THE INVENTION

The present invention relates generally to an organizing apparatus and more particularly to an organizing apparatus for use with the numerous cables and accessories in a computer or audio-video system.

2. BACKGROUND OF THE INVENTION

Computers are widely used in every field imaginable. From the most sophisticated to the basic desk top configuration, computers can be found at many offices and houses. Nowadays, many peripherals such as scanners, cameras, printers, network switches, audio players, video player, etc., are connected to computers. The more peripherals that are connected, the messier the connection of cables becomes due to the various sizes and colors of cables used. Generally, cables connecting the monitor to the central processing unit (CPU), the keyboard to the CPU and etc., are left extending and dangling from the back and are not properly organized. Very often, the cables become entangled thus creating confusion should malfunction occur and there is a need to locate the cause of the malfunction, not excluding the potential danger it posed to the user. Often, adding connection of peripherals to the CPU becomes a problem, as all the necessary ports and sockets are located at the back of the CPU. Most computers are quite heavy, especially the typical desk top computer, and not many people are willing to spend time and effort to perform such job even if it will affect his/her productivity. As an example, it would be generally easy to replace a printer with another, however as the connection is located at the back of the CPU and usually configured at a hard-to-reach place, the task becomes difficult and usually we left the task to be executed by the technician. As computers become more sophisticated, additional accessories are created to cater for the various needs of the user. Some of these small accessories, such as printer selectors and extension cables are unnecessarily built with large casings, and these large casing definitely add more to the untidiness and the wasting of valuable space on the workstation.

Therefore, there is a need the art to have an apparatus and method which can contain and store excess cables and to dispense only the necessary amount of cables, and store the rest in a systematic, dispensable, organized and pleasing manner. Additionally, there is a need in the art to provide a particularly easy and simple system where connecting sockets and ports which are normally located at the back of the CPU are relocated to the front so as to provide easier peripherals connection without the need to move or turn the normally heavy CPU. In addition, there is also a need in the art to provide an organizing apparatus with a power distribution outlets incorporated therein, and where the extra lengths of power cables may be stored within the apparatus. There is also a need in the art to have an organizing apparatus where, switches, controls device, sockets and other small electrical accessories or devices can be secured thereto and fixed to its body, without the need of a separate device connecting the same to the CPU by means of cables.

There are attempts made by inventors to provide solutions to some of the above-mentioned problems. For example, U.S. Pat. No. 4,721,268 discloses a modular power cord and cable organizer consisting of identical elongated containers which can be used singly or attached in multiple units. The device allows shortening and organizing of the power cords, wires and cables. The device generally consist of a cover and a base and cable, wire or cord is passed through an opening in the base and cover. The cable is then coiled within the base fitted between the upright protrusions and exit through another opening. While this prior art organizing device do fulfill the intended function, it does not fulfill the requirement of eliminating problems associated with connection of peripherals to the CPU. Still, the computer users need to turn the back of the CPU so that the hard-to-reach ports or sockets can be reached. Another U.S. Pat. No. 5,372,225 discloses an audio and video cable storage organizer for storing excess audio and video cable on reels within a housing. Each of the reels stores thereon a length of cable and extended therefrom through a slot in the housing and connected to any electrical device such as VCR, etc. The cables are electrically connected through a switching arrangement which allows operation of selected devices. This particular device is generally limited to be used for audio and video equipment.

Therefore, the present invention seeks to overcome problems associated with the prior art organizing apparatus. Generally, the present invention proposed an attractive and ergonomically designed organizing apparatus for cable where excess cable can be systematically stored in a housing or in a compartment within a housing. The number and the size of compartment may also be varied due the use of removable panels. The apparatus is also provided with a communication sockets and ports where connection of any peripherals may be easily accomplished without the need to turn the back of the computer's CPU. Additionally, the apparatus is provided with a power distributing means which advantageously reduces the difficulty in finding adequate power supply outlet for multiplicity of equipment and peripherals used. In addition, the apparatus is provided with an accessory connection bay in a form of recess and removable slide, and the accessory connection bay is featured at the front or side portion of the apparatus body so as to enable fixing and securing of switches, sockets, control devices and other electrical accessories, thereby eliminating the need of an individually independent devices. Additionally, the accessories are mounted on an attachment mechanism in a form of plate and sliding portion for enabling easier fixing of the accessories to the accessory connection bay.

3. SUMMARY OF THE INVENTION

Accordingly, it is the primary object of the present invention to provide an organizing apparatus for use with the numerous cables for computer and one which remedy the limitations of the prior art.

It is another object of the present invention to provided an organizing apparatus for use with the numerous cable for computer wherein the cables are arranged within a casing.

It is another object of the present invention to provided an organizing apparatus for use with the numerous cable for computer wherein the cables are arranged in a compartment within a casing.

It is another object of the present invention to provide an organizing apparatus for use with a computer where the connection of peripherals and accessories to the computer can easily be accomplished through the relocation of the sockets and ports to the front and/or side portion of the apparatus.

It is another object of the present invention to provide an organizing apparatus for use with a computer where connection of peripherals and accessories are easily accomplished by providing a demountable attachment of accessories provided with a flexible attachment mechanism.

It is another object of the present invention to provide a flexible organizing apparatus wherein the number and size of the organizing means can be varied according to need.

It is yet another object of the present invention to provide an organizing apparatus for use with an audio and video system.

These and other objects of the present invention are accomplished by providing,

An organizing apparatus (10) comprising;
   a housing having a main body section (11); and
   said main body section (11) is provided with a cable organizing means (12) and a cable inlet and outlet means (13);
   wherein said main body section (11) is further provided with an accessory connection bay (14).

The further object of the present invention may also be realized by providing,

An organizing apparatus (10) for use with an audio and video system comprising;
   a housing having a main body section (11); and
   said main body section (11) is provided with a cable organizing means (12), a cable inlet and outlet means (13);
   wherein said main body section (11) is further provided with an accessory connection bay (14).

Preferably, the accessory connection bay is formed by means of a recess and closable by a slide.

Also preferable, accessory for used with the apparatus is mounted on a plate and the plate is demountably attached to the recess of the accessory connection bay.

Also preferable, the organizing means is formed having a plurality of compartment having a plurality of panels and slots.

Preferably, the panels forming the compartments are removably mounted to the main body section.

It is also preferable that the organizing apparatus is provided with communication sockets or ports, whereby the sockets and ports which are normally configured at the rear of a CPU are relocated to the organizing apparatus at the accessory connection bay.

Also preferable, the accessory connection bay is configured at the front and side section of the apparatus main body so as to enable fixing and securing of switches, sockets, control devices and other electrical accessories, thereby eliminating unnecessary usage of independent devices related to the accessories.

It is also preferable that apparatus may be configured so as to provide a multiple power outlet means where power requirement of peripherals connected thereto may conveniently be met.

4. BRIEF DESCRIPTION OF THE DRAWINGS

The embodiments of the invention will now be described, by way of example only with reference to the accompanying figures in which.

5. DETAILED DESCRIPTION OF THE DRAWINGS

Figure 1:
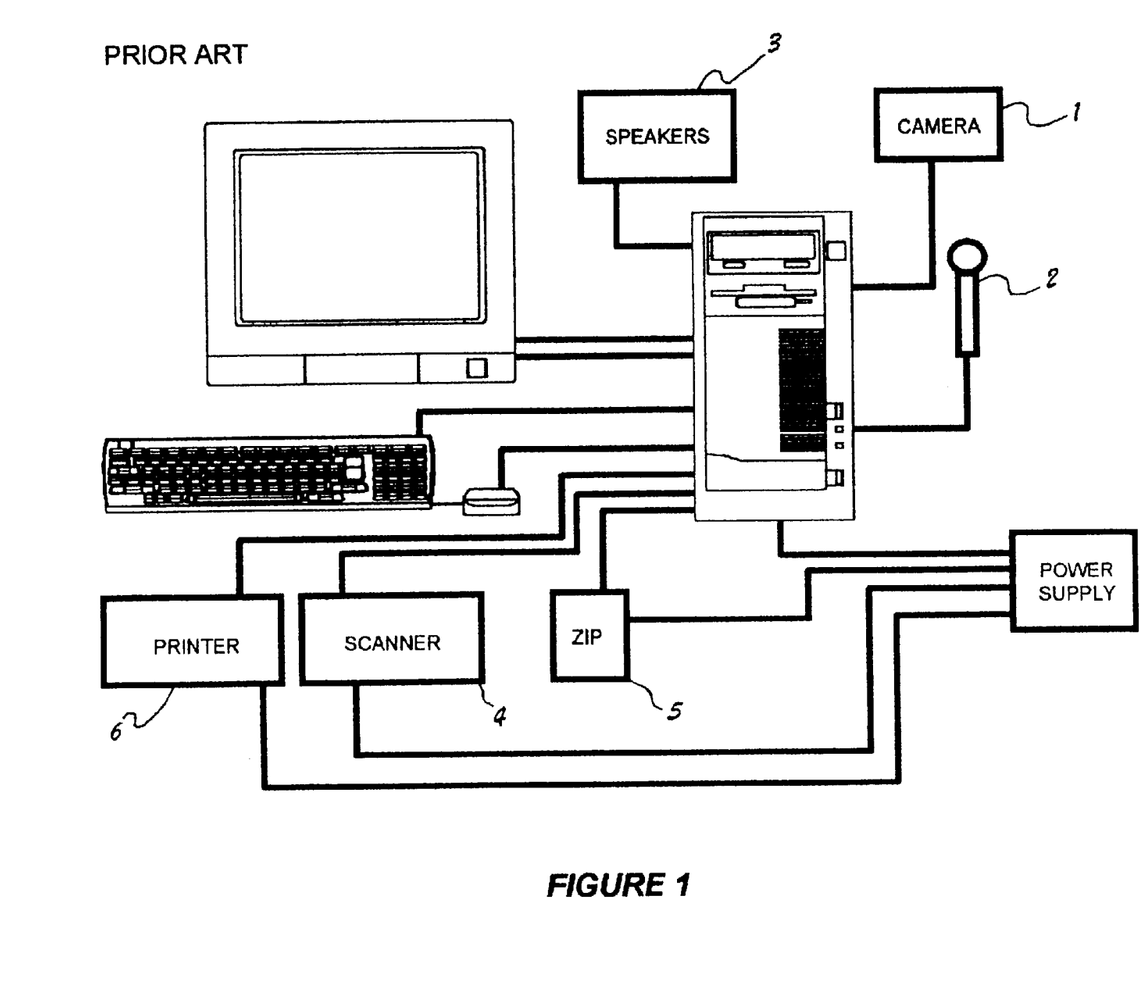
FIG. 1: Representation of a typical computer system with accessories and peripherals connected thereto.

FIG. 1 shows a general representation of a typical computer system with a multiplicity of peripherals and accessories connected thereto. Nowadays, it is fairly common to see a computer system having such multi-media equipment, which usually includes camera (1), micro-phone (2) and speakers (3). Additionally, we may find a computer system which is provided with add-on peripherals such as scanner (4), zip drive (5) along with the normal printer (6). All of these peripherals and equipment provides flexibility to the user as the computer system can be used as productivity tool and also for entertainment. However, the more peripherals there are, the more cable are used and the messier the cable organization becomes. Such a messy and disorganized cables arrangement becomes an eye sore and also creates difficulty in finding fault associated with the peripherals if a fault should occur.

Figure 2:
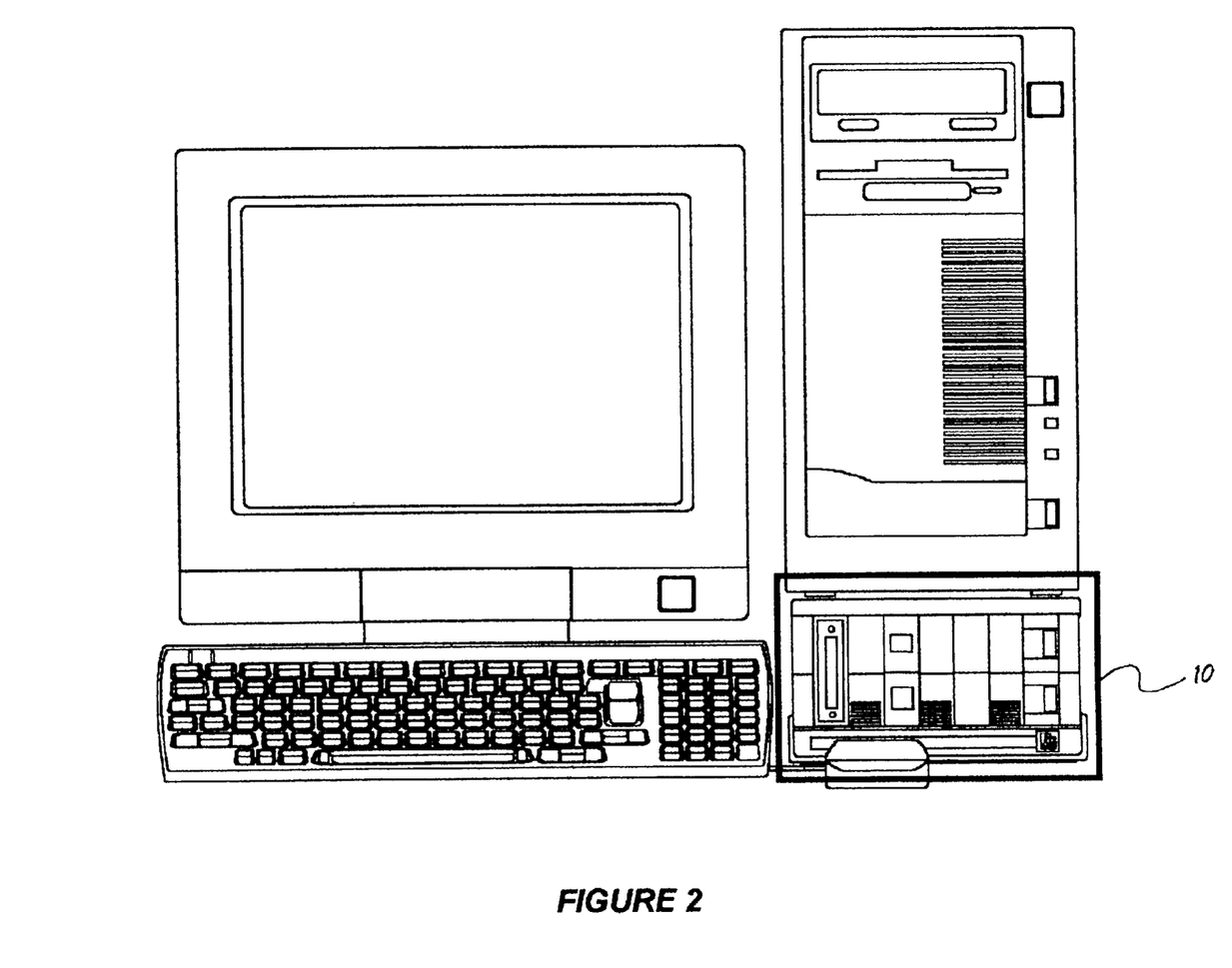
FIG. 2: Representation o computer with accessories and peripherals connected which utilizes embodiment of the present invention.

FIG. 2 shows a computer system which is provided with the embodiment of the present invention. The feature of the invention resides in the use of an organizing apparatus (10) which arrange cables associated with each of peripherals in a systematic, aesthetic, flexible and convenient arrangement. Excess cables are advantageously stored within a housing and only the necessary amount are dispensed. Communication ports (not shown) for printer and other peripherals which are normally configured at the back of the CPU are transferred to the housing, thus providing a more convenient peripherals connection feature. Power distribution mechanism (not shown) is also incorporated in the embodiment so as to provide means for convenient source of power supply for use by the peripherals and accessories. Additionally, accessory connection bay (not shown) is also arranged at the front and side section of the main body section, with the purpose of allowing fixing and securing of switches, sockets, control devices and other electrical accessories.

Figure 3A:
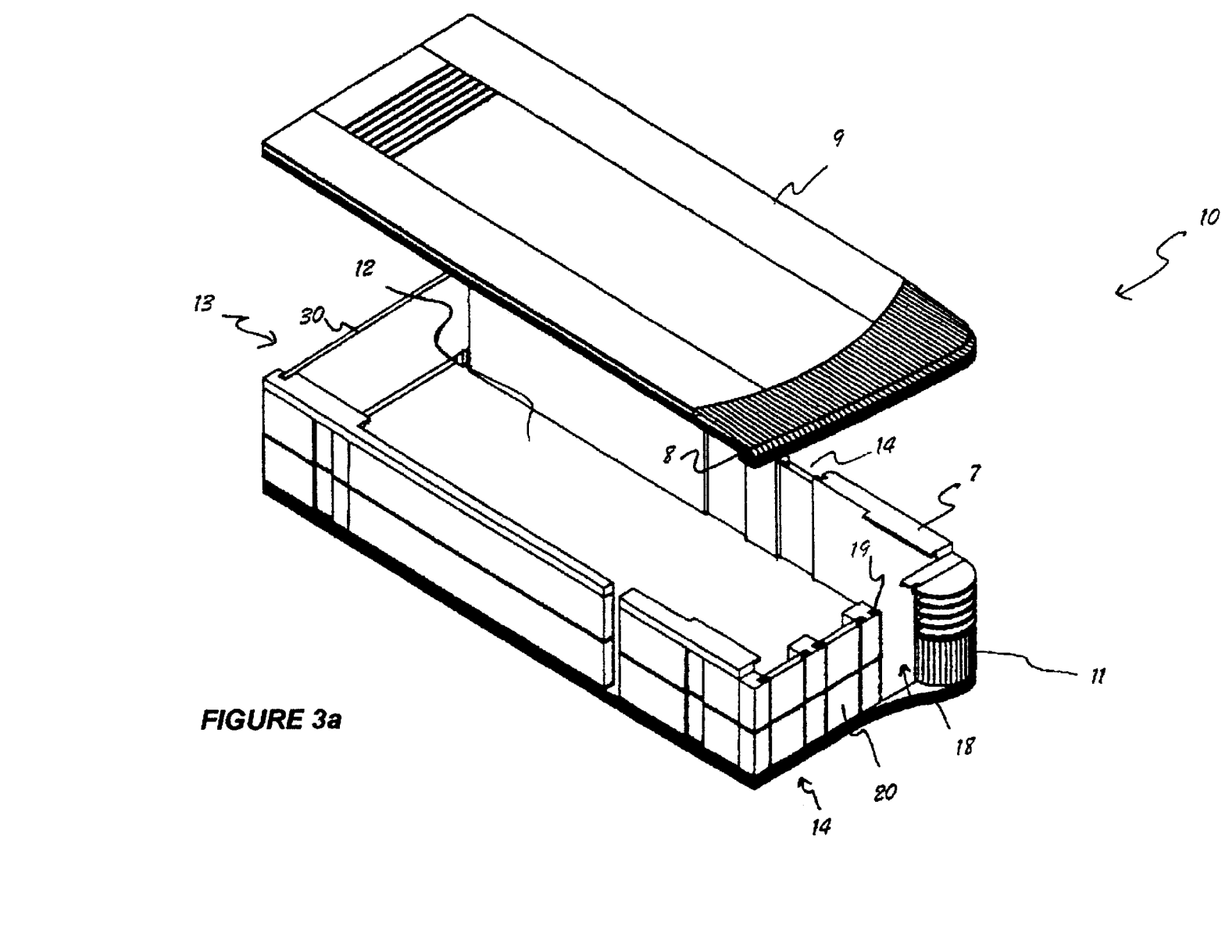
FIG. 3: Perspective view of an organizing apparatus according to the embodiment of the present invention.
Figure 3B:
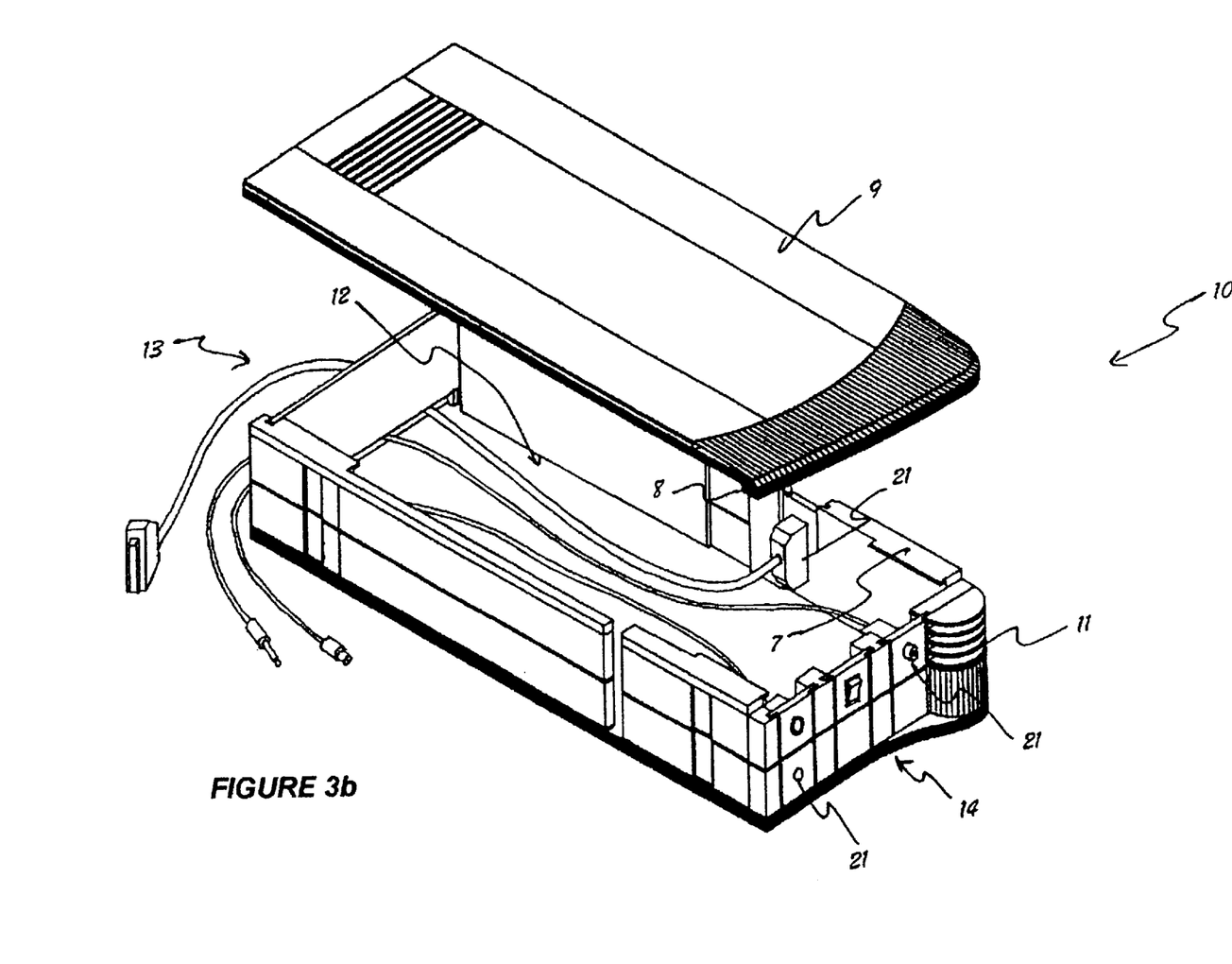

Now referring to FIG. 3a and FIG. 3b, there are shown perspective views of the organizing apparatus configured in accordance to the embodiment of present invention. Generally, the organizing apparatus comprises of a housing and the housing is configured having a main body section (11) and the main body section is provided with a cable organizing means (12), cable inlet and outlet means (13) and optionally, provided with a cover (9). The cover (9) may be demountably attached or hingedly connected to the main body section. The demountable attachment of the cover is made possible through the use of a slotting mechanism using a feature such as a hood lock (8) which is configured to mate with a hood strips (7) of the main body. The hinged-type attachment provides ease of use as the cover can simply be flipped for allowing access. Cable organizing means (12) is advantageously provided through the used of a chamber within the main body section (11) which allows folded cable to be placed therein. Prior to the cable placement, preferably the cable is fastened using any fastening means such as string, plastic fastener or the like. The cable inlet and outlet means (13) is generally configured at the rear of the apparatus.

Preferably, a plurality of accessory connection bays (14), are arranged along the front and side of the main body section (11). The accessory connection bay (14) is generally utilized for allowing attachment of any electrical accessory (21) for use by the computer system. The excess cable associated with such accessory is advantageously folded within the chamber of the main body section (11). The specific feature of accessory utilized in combination with the organizing apparatus will be discussed in detail later. The accessory connection bay (14) is generally formed as a recess (18) and the recess is closable by a slide (20). The slide may be mounted to the recess (18) through utilization of sliding channel (19) and the sliding channel is formed on the main body section.

As generally shown by FIG. 3b, electrical accessory (21), such as switch, printer port, microphone socket, etc., may be demountably attached to the accessory connection bay (14), simply by removing the slide (20) and replacing the same. The accessory is preferably formed mounted on a plate (22, shown in detail by FIGS. 6a, 6b and 7) and the plate is provided with a sliding portion (41). The plate (22) is formed to match with the dimension of the recess (18) and the sliding portion (41) shall be formed to match with the width and thickness of the sliding channel (19). Any type of electrical accessory may be adapted, provided that the electrical devices must be mounted on plate as shown by the figures.

Figure 4A:
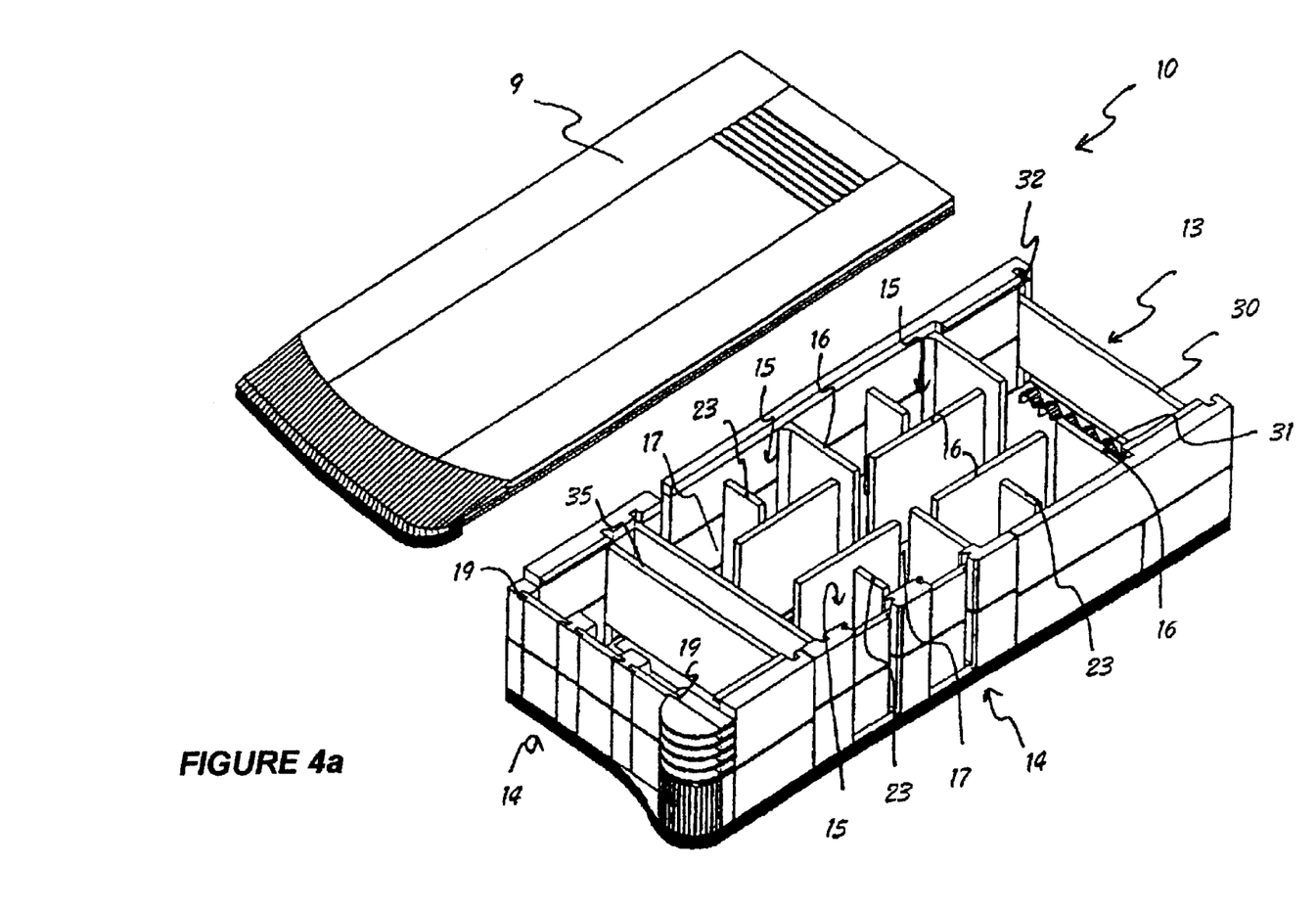
FIG. 4: Perspective view of an organizing apparatus according to another embodiment of the present invention.
Figure 4B:
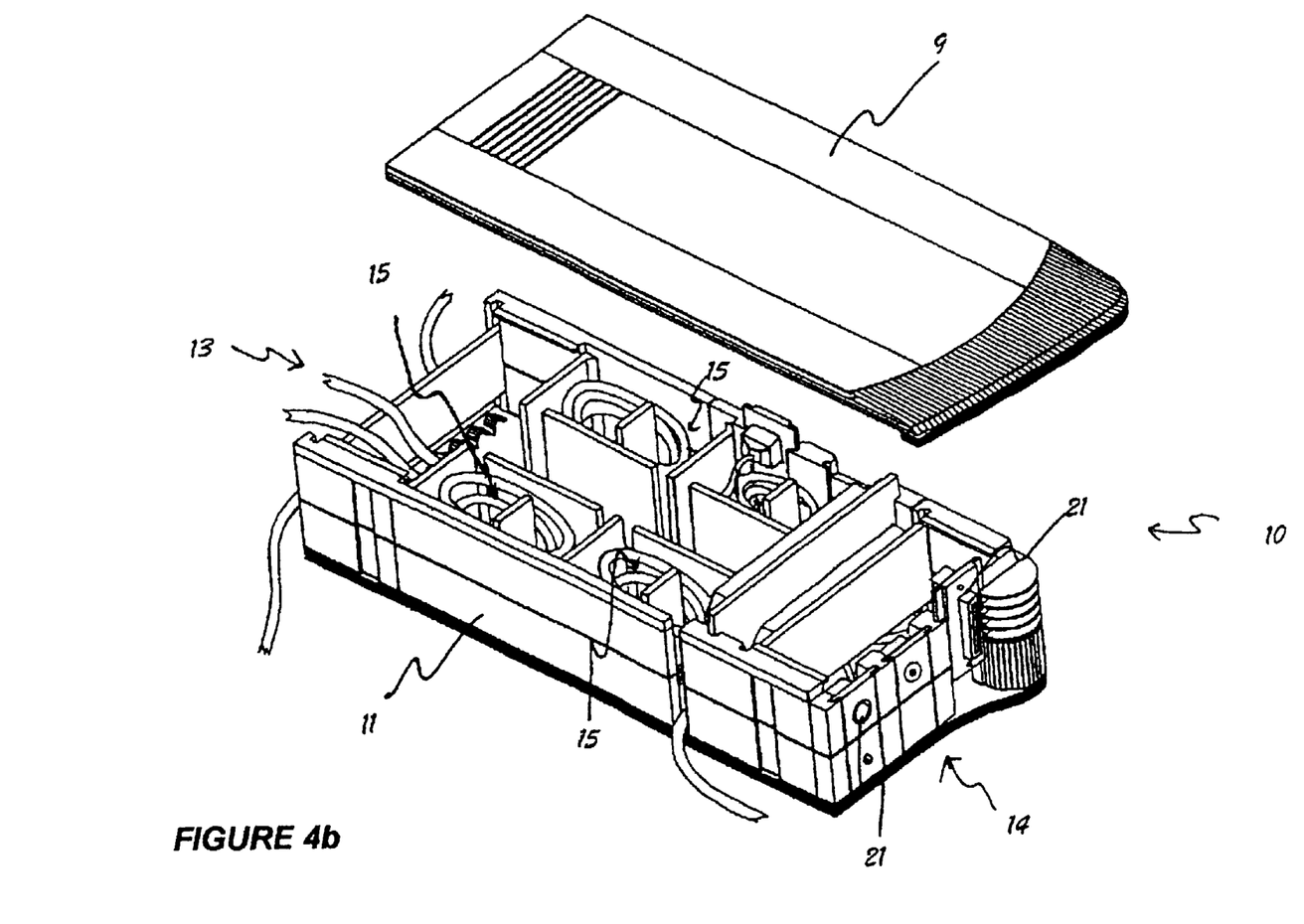

FIGS. 4a and 4b generally show another aspect of the embodiment. The main body section (11) is provided with a cable organizing means (12) in a form of a compartment (15). Preferably a plurality of such compartments are formed, and the excess cable is advantageously folded and stored within the compartments. The compartments (15) may be constructed using panels (16), and slots (17) are also provided thereto for allowing cable to enter and exit from the compartment. Alternatively, an upwardly extending protrusion (23) may be formed within the center of each of the compartment for assisting excess cable storing where the cable may be coiled or wound around the protrusion. In another aspect of the embodiment, the panels (16) and the protrusions (23) are removably mounted to the main body section (11) base so as to provide a flexible system whereby the size of the compartment may be increased or reduced in accordance to need. Cables from peripherals and to CPU may enter and exit at the rear of the apparatus through an inlet and outlet means (13), and the inlet and outlet means is generally comprises of, preferably, a removable panel (30) and a plurality of hooks (31). The removable panel is slotted into the corresponding channel (32) which is formed on the main body section to provide such flexible feature. The hooks (31) are utilized to separate each cables from being entangled with each other and for ease of reference. Communication sockets may be arranged on the main body section so as to provide the advantageous feature of allowing easier peripherals connection to the CPU. The sockets (21), or commonly known as ports, provide linkage with ports which are normally fixed at the back of the CPU which are relocated to the front using, for example, extension cable. The common practice of turning the back of the CPU to connect or disconnect printer, microphone, headphone, video camera or etc. is now, no longer necessary. The sockets or ports (21) are mounted to main body section at the accessory connection bay (14) mentioned earlier. By removing the removable slide (20), switches, control devices and other electrical accessories may be fixed and secured, therefore, the devices can be 'built-in' within the apparatus and separate independent devices are no longer necessary.

Figures 12, 13:
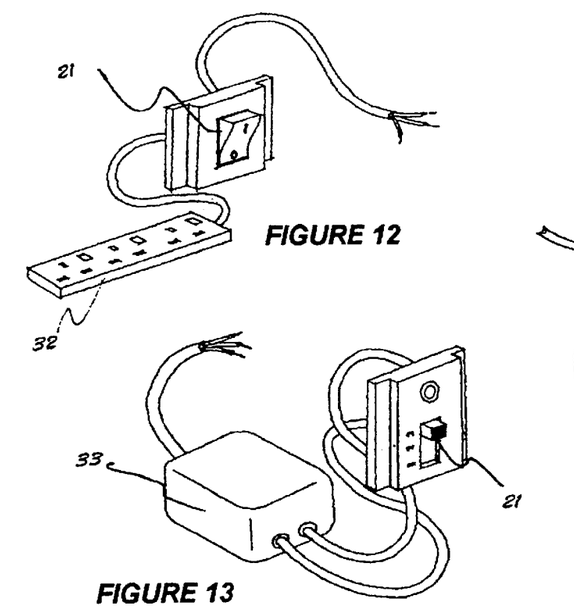
FIG. 12: Another perspective view showing some other example of apparatus accessories.
FIG. 13: Another perspective view showing some other example of apparatus accessories.
Figure 14:
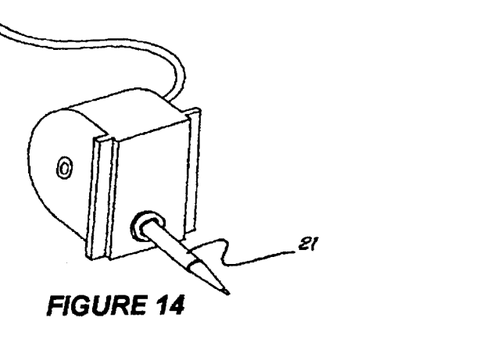
FIG. 14: Another perspective view showing some other example of apparatus accessories.
Figure 15:
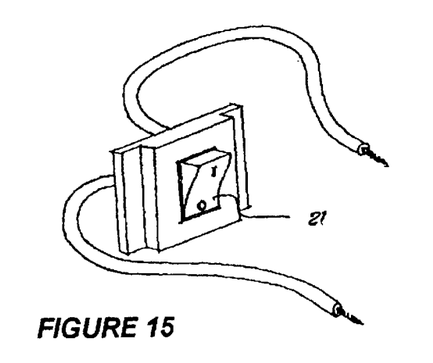
FIG. 15: Another perspective view showing some other example of apparatus accessories.
Figure 16:
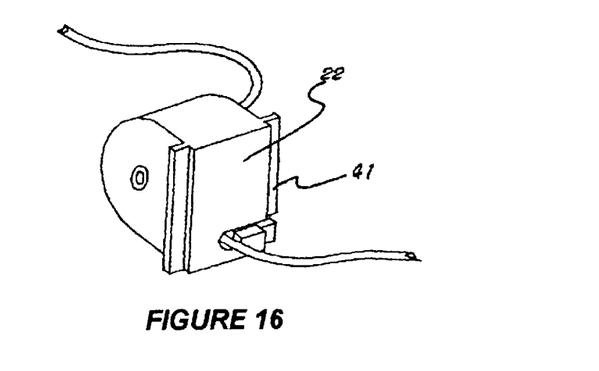
FIG. 16: Another perspective view showing some other example of apparatus accessories.

Still referring to FIGS. 4a and 4b, another compartment may be optionally arranged near the front of the housing to provide placement of transformer (33, shown in FIG. 13), the transformer is generally incorporated as an optional device, and a power distribution means (32, shown in FIG. 12) separated by removable panels (35), so that power requirement of the peripherals are met. The power distribution means can also be met with the use of conventional power sockets and plugs inserted within the chamber of the main body section.

Still referring to the figures, the cable entry and exit section consists of the cable inlet and outlet means (13) and removable panel (30). Hooks (31) are used to separate each cable from becoming entangled with each other and for easy reference and the panel may be configured to be removable or alternatively, provided with a recess for allowing cables to reach to the compartments (15). The compartments are configured using panels (16) and provided with slots (17). In use, cable from any peripherals enters through the rear of the apparatus at the inlet and outlet means (13), is held by any of the hooks (31), passes through the recess, then enters to the compartment (15) through one of the two slots (17), is folded and exits through the same or another slot (17) and back to the inlet and outlet means (13) which is then connected to the CPU. In another aspect of the embodiment, the cable enters through the inlet and outlet means (13), is held by any of the hooks (31), passes through the recess, then enters the compartment (15) through one of the two slots (17), is wound or coiled around the upwardly extending protrusion (23) and exits through the same or another slot (17) and back to the inlet and outlet means (13). The power distribution means (32) may include a series of connectors (not shown), each connector is electrically linked to the main power supply cable (not shown) and main switch (also not shown). Optionally, a transformer (also not shown) is arranged within the compartment to cater for peripherals which require a lower voltage setting. As discussed earlier, along the front and side of the main body section (11), there are provided recesses (18) which can be replaced by electrical accessories such as communication sockets, switches, power sockets and other electrical items (shown in FIGS. 6a, 6b, and 7–16). The recess forms part of the accessory connection bay essential to the present invention. Preferably, some of the panels (16) forming the compartments are of the removable type. Hood strips (7) are also provided partially along the upper section of the main body to allow demountable placement of the optional cover, by sliding the cover through the hood strips. A hinged-type attachment may also be used as described earlier.

Figure 5A:
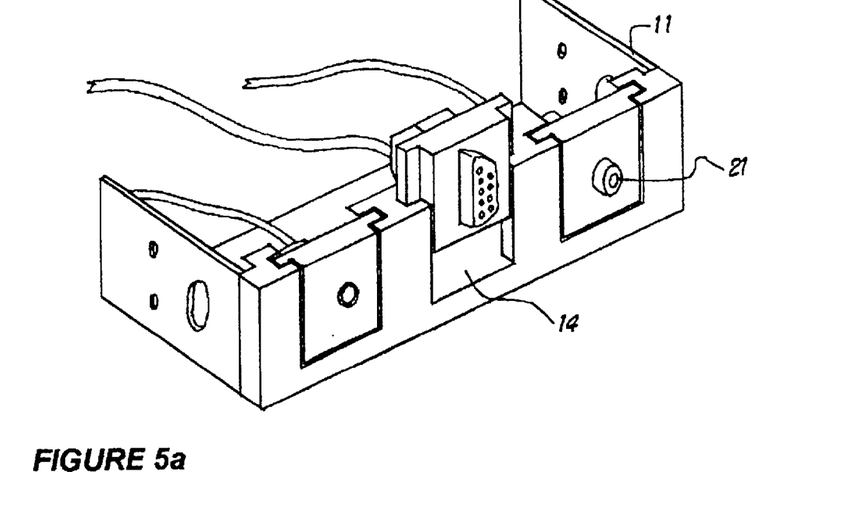
FIG. 5: Perspective view of an organizing apparatus according to another embodiment of the present invention, and the incorporation of the present invention into a computer system.

FIG. 5a shows yet another embodiment of the present invention. The organizing apparatus comprises a housing (11), which can be adapted to be fitted into the drive bay (37) of a computer or a computer casing (38). The front panel of the said housing is introduced with a plurality of accessory connection bays (14).

Figure 5B:
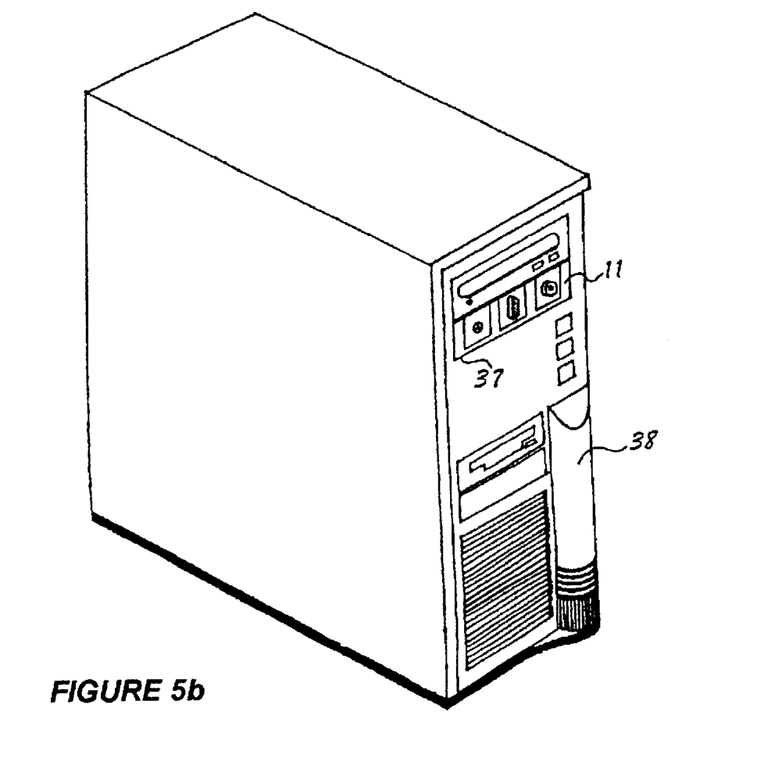
Figure 5C:
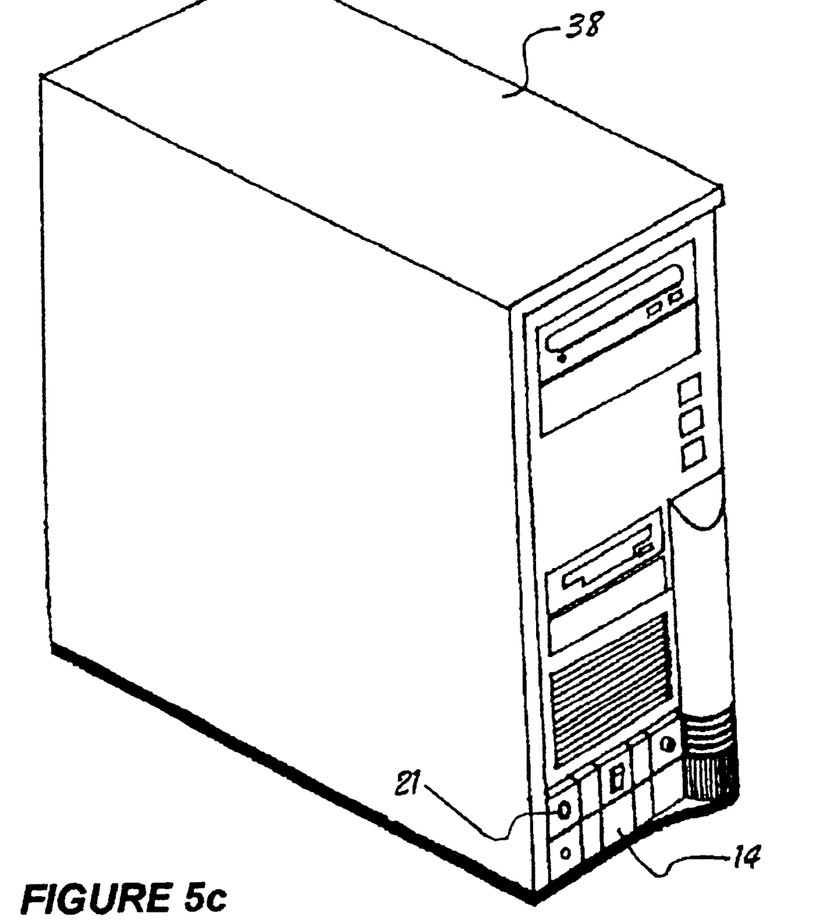

FIG. 5b shows the incorporation of the organizing apparatus into a computer or computer casing (38). The computer or computer casing (38) comprises a plurality of accessory connection bays (14) introduced at the front panel of the casing. Still referring to FIGS. 5a and 5b, the accessory connection bay is arranged at the front section of the housing or the casing, with the purpose of allowing the fixing and securing of switches, sockets, electrical devices and other electrical accessories. It also serves to relocate the computer ports or sockets to the front of the computer system. Hence the connection of the peripherals and accessories to the computer can easily be accomplished.

The accessory connection bay (14) referred to in FIGS. 5a and 5b, comprises a recess or a cut out to the housing and the said recess or cut out is introduced with sliding channel (19) or sliding means. The apparatus accessory (clearly illustrated in FIG. 6) can be fittingly slipped in the accessory connection bay (14).

Figure 6A:
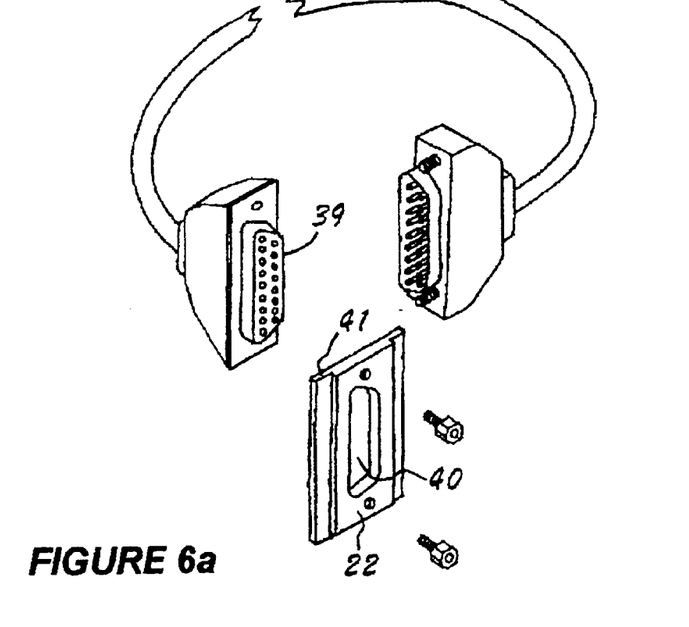
FIG. 6: Perspective view of an apparatus accessory in accordance with the feature of the present invention.
Figure 6B:
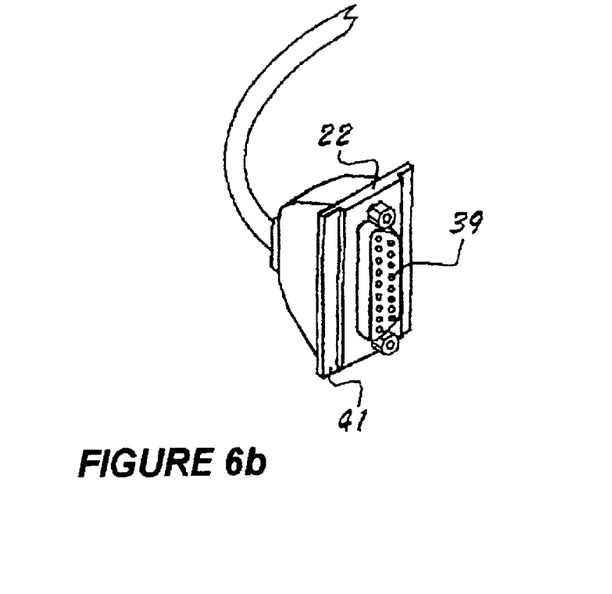
Figures 7, 8, 9, 10, 11:
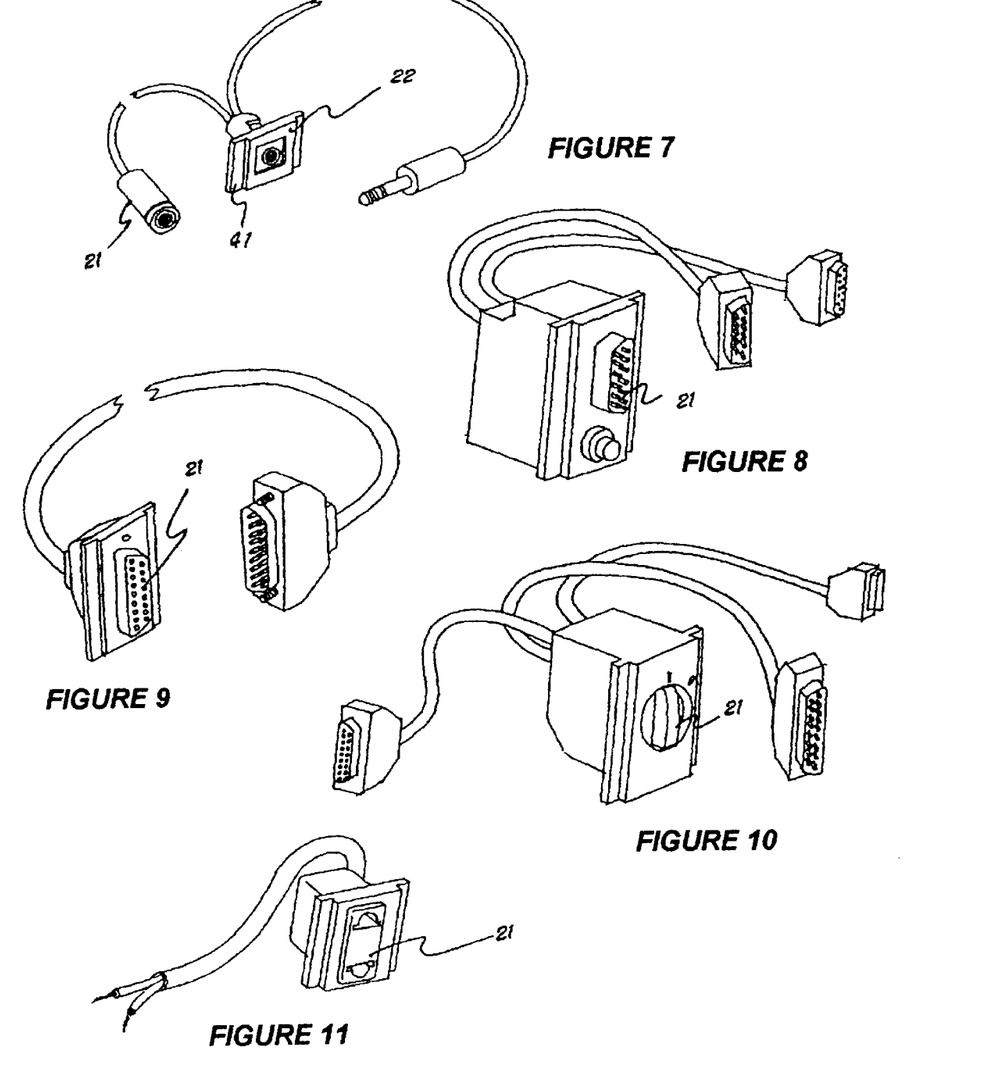
FIG. 7: Another perspective view showing other example of apparatus accessories.
FIG. 8: Another perspective view showing some other example of apparatus accessories.
FIG. 9: Another perspective view showing some other example of apparatus accessories.
FIG. 10: Another perspective view showing some other example of apparatus accessories.
FIG. 11: Another perspective view showing some other example of apparatus accessories.

FIGS. 6a and 6b show the details of the current invention's accessory. A plate (22) comprises of a cut out (40) where computer port or socket (39) can be flexibly mounted onto the plate. The plate is further introduced with sliding portion (41) or sliding means. FIG. 6b shows the accessory with a computer port or socket mounted onto the plate. The plate can be fittingly slipped into the accessory connection bay (14), hence securely hold and position the computer port or socket at the front of the computer system. The apparatus accessory will include all computer ports or sockets, to flexibly relocate the said port or socket to the front of the computer system. FIG. 7 shows the apparatus accessory used for the relocation of a earphone or audio socket to the front of the computer system. FIG. 9 shows the apparatus accessory for a parallel or printer port for the same purpose.

It may be readily realized that the apparatus accessory can comprise a plate (22) illustrated in FIG. 6a, or it can also comprise a computer port or socket mounted on the plate (22) as illustrated in FIGS. 7 and 9.

FIGS. 8 and 10–16 show some other examples of the apparatus accessory used to hold and secure electrical devices or electrical components at the front of the computer system.

It may be readily realized that, the organizing apparatus may be offered to a consumer with or without such described apparatus accessories. The apparatus accessories can be offered to consumer separately from the apparatus, so that the need of the customer can be fulfilled according to their requirements.

While the preferred embodiments of the present invention have been described, it should be understood that various changes, adaptations and modifications may be made thereto. It should be understood, therefore, that the invention is not limited to details of the illustrated invention shown in the figures and that variations in such minor details will be apparent to one skilled in the art.

What is claimed is:

1. A system comprising:
    a computer casing having a front and a back and having a plurality of drive bays, at least one of the drive bays being accessible from the front of the casing, the casing having an opening in the front aligned with one of the drive bays, the opening having a shape;
    a computer cable having first and second opposite ends, and computer connectors at each of the ends, the first end including a frame, surround the connector at the first end, and defining edges shaped for sliding, mating engagement in a slot, the second end of the cable being adapted to be routed interior of the computer casing to the back of the casing for mating electrical engagement with a port at the back of the casing; and
    an organizing apparatus including a housing sized to be received in one of the drive bays, the housing having a front side accessible from the front of the computer casing, when the housing is received in the drive bay, the front side of the housing having a peripheral shape corresponding to the shape of the opening, to removably slidably mate with the opening, the front side of the housing of the organizing apparatus further having a slot therein for removable sliding receipt of the frame in a direction along a generally vertical plane, the slot supporting the second end of the cable against movement in a horizontal direction, wherein, after the organizing apparatus is received in the drive bay, one of the computer connectors is accessible from the front of the computer housing.

2. A system in accordance with claim 1 wherein the front side has a plurality of slots for removable sliding receipt of respective frames.

3. A system in accordance with claim 1 wherein the front side has a plurality of slots for removable sliding receipt of respective frames, and further comprising a plurality of ends of cables received in respective slots.

4. A system in accordance with claim 3 wherein at least two of the computer connectors are of different types.

5. A system in accordance with claim 3 wherein the computer connectors comprise a parallel connector.

6. A system in accordance with claim 3 wherein the computer connectors comprise an audio connector.

7. A system in accordance with claim 3 wherein the slot and the frame include tongues and grooves for sliding engagement of the frame in the slot.

8. A system in accordance with claim 3 including a plurality of cables respectively including different connector types, each including a frame having edges shaped to engage the slot in the organizing apparatus, by movement in a direction along a generally vertical plane, wherein a user can select which connectors are desired to be accessible from the front of the casing by sliding a frame of a selected one of the cables into the slot.

9. A system in accordance with claim 3 wherein the connectors on either end of one of the cables are of a same type.

10. A computer comprising:
    a computer casing having a front and a back and having a plurality of drive bays, at least one of the drive bays being accessible from the front of the casing, the casing having an opening in the front aligned with one of the drive bays, the opening having a shape, the casing having an aperture through the back of the casing;
    a plurality of computer ports accessible from the back of the casing;

a plurality of computer cables respectively having first and second opposite ends, and computer connectors at each of the ends, the first end of each cable including opposite edges having respective tongues on either side of the connector at the first end, the tongues being shaped for sliding, mating engagement in corresponding opposed grooves, the second end of each cable being routed interior of the computer casing, through the aperture in the back of the casing and mating with one of the plurality of computer ports at the back of the casing; and an organizing apparatus including a housing received in one of the drive bays, the housing having a front side accessible from the front of the computer casing, when the housing is received in the drive bay, the front side of the housing of the organizing apparatus having a peripheral shape corresponding to the shape of the opening, the front side further having a plurality of slots therein, each slot having opposed grooves for removable sliding receipt of the opposed tongues of one of the cables, wherein the first ends of the cables are received in respective slots, with the tongues received in the grooves.

11. A computer in accordance with claim 10 wherein at least two of the computer connectors having ends received in the slots are of a same type.

12. A computer in accordance with claim 11 wherein the computer connectors having ends received in the slots comprise a parallel connector.

13. A computer in accordance with claim 11 wherein the computer connectors having ends received in the slots comprise an audio connector.

14. A computer in accordance with claim 10 and further comprising a panel slidingly received in each slot which does not have a cable end received therein.

15. A computer in accordance with claim 10 wherein the first end of each cable includes a generally rectangular portion defining the opposite edges having tongues.

16. A computer in accordance with claim 10 wherein the connectors on either end of one of the cables are of a same type.

17. A computer in accordance with claim 10 wherein the first end of each cable is slidably removable from the organizing device by hand without need for any tool.

18. A method of providing access to a plurality of user-selectable computer ports at the front of a computer, in a computer including a housing having a front, a back, an inside, an outside, and an aperture through the back of the housing from the inside to the outside, the computer further including a drive bay accessible from the front of the housing and a plurality of computer ports at the back of the computer, the method comprising:

opening the housing;

providing a plurality of computer cables respectively having first and second opposite ends, and having computer connectors at each of the ends, the connectors at the ends of one of the cables being of a same type with a male connector at one of the ends first and second opposite and a female connector at another of the first and second opposite ends;

routing the second end of each cable inside the computer casing, through the aperture in the back of the casing and mating the connector at the second end of each cable with a port at the back of the computer;

supporting an organizing apparatus in the drive bay, the organizing apparatus including a housing having a front side accessible from the front of the computer casing, when the housing is received in the drive bay, the front side of the housing of the organizing apparatus having a plurality of slots therein, each slot being configured for sliding removable receipt of the first end of any of the plurality of computer cables, in a tongue and groove manner, without need for a tool;

sliding the first end of each cable in one of the slots in the organizing apparatus such that the connector of the first end of each cable is accessible from the front of the housing; and closing the housing.

19. A computer comprising:

an organizing apparatus including a housing sized to be received in a drive bay of a computer, the housing having a front side accessible from the front of the computer casing, when the housing is received in the drive bay, the front side of the housing of the organizing apparatus having a peripheral shape corresponding to a shape of the drive bay opening at the front of the computer, the front side further having a plurality of slots therein, each slot having opposed grooves, wherein the first ends of the cables are received in respective slots, with the tongues received in the grooves;

a plurality of cables having first and second ends, with a male connector of one type at one end and a female connector of a same type at the other end, the first end including a frame having first and second opposite edges, each edge having a tongue, the tongues being shaped for sliding receipt in the opposed grooves of any of the slots, by movement in a direction along a generally vertical plane, wherein a user can determine what connector type to place in a slot for access at the front side of the computer and can change connector types by changing cables.

* * * * *

UNITED STATES PATENT AND TRADEMARK OFFICE
CERTIFICATE OF CORRECTION

PATENT NO.    : 6,406,327 B1
DATED         : June 18, 2002
INVENTOR(S)   : Kok Soon Goh It is certified that error appears in the above-identified patent and that said Letters Patent is hereby corrected as shown below:

<u>Title page,</u>
Item [76], the inventor name should be corrected to read: -- Kok Soon Goh --

<u>Column 1,</u>
Line 23, replace "player, etc., are connected to computers. The more" with -- players, etc., are connected to computers. The more --
Line 47, replace "with large casings, and these large casing definitely add" with -- with large casings, and these large casings definitely add --
Line 50, replace "Therefore, there is a need the art to have an apparatus and" with -- Therefore, there is a need in the art to have an apparatus and --
Line 58, replace "peripherals connection without the need to move or turn the" with -- peripheral connections without the need to move or turn the --
Line 60, replace "art to provide an organizing apparatus with a power-" with -- art to provide an organizing apparatus with power- --
Line 64, replace "apparatus where, switches, controls device, sockets and" with -- apparatus where, switches, control devices, sockets and --

<u>Column 2,</u>
Line 8, replace "wires and cables. The device generally consist of a cover and" with -- wires and cables. The device generally consists of a cover and --
Line 9, replace "base fitted between the upright protrusions and exit through" with -- base fitted between the upright protrusions and exits through --
Line 10, replace "another opening. While this prior art organizing device do" with -- another opening. While this prior art organizing device does --
Line 31, replace "size of compartment may also be varied due the use of" with -- size of compartment may also be varied due to the use of --
Line 32, replace "removable panels. The apparatus is also provided with a" with -- removable panels. The apparatus is also provided with --
Line 45, replace "an individually independent devices. Additionally, the" with -- individually independent devices. Additionally, the --
Line 53, replace "numerous cables for computer and one which remedy the" with -- numerous cables for computer and one which remedies the --
Line 55, replace "It is another object of the present invention to provided an" with -- It is another object of the present invention to provide an --
Line 56, replace "organizing apparatus for use with the numerous cable for" with -- organizing apparatus for use with the numerous cables for --
Line 57, replace "computer wherein the cables are arranged within a casing." with -- computers wherein the cables are arranged within a casing. --
Line 58, replace "It is another object of the present invention to provided an" with -- It is another object of the present invention to provide an --
Line 59, replace "organizing apparatus for use with the numerous cable for" with -- organizing apparatus for use with the numerous cables for --
Line 60, replace "computer wherein the cables are arranged in a compartment" with -- computers wherein the cables are arranged in a compartment --

UNITED STATES PATENT AND TRADEMARK OFFICE
CERTIFICATE OF CORRECTION

PATENT NO. : 6,406,327 B1
DATED : June 18, 2002
INVENTOR(S) : Kok Soon Goh

It is certified that error appears in the above-identified patent and that said Letters Patent is hereby corrected as shown below:

Column 3,
Line 34, replace "Also preferable, accessory for used with the apparatus is" with -- Also preferable, accessory for use with the apparatus is --
Line 38, replace "plurality of compartment having a plurality of panels and" with -- plurality of compartments having a plurality of panels and --
Line 65, replace "FIG. 2: Representation o computer with accessories and" with -- FIG. 2: Representation of computer with accessories and --

Column 4,
Line 46, replace "user as the computer system can be used as productivity tool" with -- user as the computer system can be used as a productivity tool --
Line 48, replace "there are, the more cable are used and the messier the cable" with -- there are, the more cables are used and the messier the cable --
Line 50, replace "cables arrangement becomes an eye sore and also creates" with -- cable arrangement becomes an eyesore and also creates --

Column 5,
Line 6, replace "accordance to the embodiment of present invention." with -- accordance to the embodiment of the present invention. --
Line 7, replace "Generally, the organizing apparatus comprises of a housing" with -- Generally, the organizing apparatus comprises a housing --
Line 16, replace "with a hood strips (7) of the main body. The hinged-type" with -- with hood strips (7) of the main body. The hinged-type --
Line 19, replace "advantageously provided through the used of a chamber" with -- advantageously provided through the use of a chamber --
Line 51, replace "electrical devices must be mounted on plate as shown by the" with -- electrical devices must be mounted on a plate as shown by the --
Line 63, replace "compartment for assisting excess cable storing where the" with -- compartments for assisting excess cable storing where the --

Column 6,
Line 5, replace "is generally comprises of, preferably, a removable panel (30)" with -- is generally comprised of, preferably, a removable panel (30) --
Line 9, replace "hooks (31) are utilized to separate each cables from being" with -- hooks (31) are utilized to separate each cable from being --

UNITED STATES PATENT AND TRADEMARK OFFICE
CERTIFICATE OF CORRECTION

PATENT NO. : 6,406,327 B1
DATED : June 18, 2002
INVENTOR(S) : Kok Soon Goh It is certified that error appears in the above-identified patent and that said Letters Patent is hereby corrected as shown below:

Column 10,
Lines 5 and 6, replace "male connector at one of the ends first and second opposite"" with -- male connector at one of the first and second opposite ends --
Line 26, insert on new line following "A computer comprising:" -- a computer casing: --
Line 28, replace "received in a drive bay of a computer, the housing" with -- received in a drive bay of the computer, the housing --

Signed and Sealed this

Twelfth Day of August, 2003

JAMES E. ROGAN
*Director of the United States Patent and Trademark Office*